(12) United States Patent
Sharma et al.

(10) Patent No.: US 12,033,614 B2
(45) Date of Patent: Jul. 9, 2024

(54) SYSTEM AND METHOD FOR SECURE DATA AUGMENTATION FOR SPEECH PROCESSING SYSTEMS

(71) Applicant: Nuance Communications, Inc., Burlington, MA (US)

(72) Inventors: Dushyant Sharma, Mountain House, CA (US); Patrick Aubrey Naylor, Reading (GB); Francesco Nespoli, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 17/840,787

(22) Filed: Jun. 15, 2022

(65) Prior Publication Data

US 2023/0410789 A1 Dec. 21, 2023

(51) Int. Cl.
*G10L 13/08* (2013.01)
*G06F 21/62* (2013.01)
*G06F 40/166* (2020.01)
*G10L 13/033* (2013.01)
*G10L 17/02* (2013.01)

(52) U.S. Cl.
CPC .......... *G10L 13/08* (2013.01); *G06F 21/6245* (2013.01); *G06F 40/166* (2020.01); *G10L 13/033* (2013.01); *G10L 17/02* (2013.01)

(58) Field of Classification Search
CPC ....... G10L 13/08; G10L 13/033; G10L 17/02; G06F 40/166; G06F 21/6245
See application file for complete search history.

(56) References Cited

U.S. PATENT DOCUMENTS 11,217,223 B2 * 1/2022 Gkoulalas-Divanis ..................... G10L 13/00
2021/0335337 A1 10/2021 Gkoulalas-divanis et al.

OTHER PUBLICATIONS

"International Search Report and Written Opinion Issued in PCT Application No. PCT/US23/022812", dated Jul. 26, 2023, 12 Pages.
Tomashenko, et al., "Introducing the VoicePrivacy Initiative", In Repository of arXiv:2005.01387v3, Aug. 11, 2020, 5 Pages.
Werchniak, et al., "Exploring the Application of Synthetic Audio in Training Keyword Spotters", In Proceedings of the IEEE International Conference on Acoustics, Speech and Signal Processing (ICASSP), Jun. 6, 2021, pp. 7993-7996.

* cited by examiner

*Primary Examiner* — Sonia L Gay
(74) *Attorney, Agent, or Firm* — Brian J. Colandreo; Heath M. Sargeant; Holland & Knight LLP

(57) ABSTRACT

A method, computer program product, and computing system for receiving an input speech signal. A transcription of the input speech signal may be received. A speaker embedding may be extracted from the input speech signal. Acoustic properties from the input speech signal may be extracted. An obscured transcription may be generated from the transcription, where the obscured transcription includes obscured representations of sensitive content from the transcription. An obscured speech signal may be generated based upon, at least in part, the extracted speaker embedding and the obscured transcription, where the obscured speech signal includes obscured representations of sensitive content from the input speech signal. The obscured speech signal may be augmented based upon, at least in part, the extracted acoustic properties.

20 Claims, 6 Drawing Sheets

SYSTEM AND METHOD FOR SECURE DATA AUGMENTATION FOR SPEECH PROCESSING SYSTEMS

BACKGROUND

Ambient Cooperative Intelligence (ACI) may be used, e.g., to turn transcribed conversational (e.g., physician, patient, and/or other participants such as patient's family members, nurses, physician assistants, etc.) speech into formatted (e.g., medical) reports. Such reports may be reviewed, e.g., to assure accuracy of the reports by the physician, scribe, etc. Further, such automatically generated conversational data may be used in combination with audio encounter information to train speech processing systems or models to more accurately convert audio encounter information to a textual representation. Training such systems requires a large collection of labeled training data (e.g., audio data and corresponding text transcriptions). This data is usually stored for considerable periods of time for training various speech processing systems.

To improve the accuracy of speech processing, data augmentation may allow for the generation of new training data for a machine learning system by augmenting existing data to represent new conditions. For example, data augmentation has been used to improve robustness to noise and reverberation, and other unpredictable characteristics of speech in a real world deployment (e.g., issues and unpredictable characteristics when capturing speech signals in a real world environment versus a controlled environment).

However, storing audio encounter information and corresponding text transcriptions for training a machine-based speech processing system may present a security concern. Additionally, conventional approaches only retain high level features for the audio data (by extracting log Mel Filterbank features on short segments of the audio and encrypting the features). However, this approach restricts the proper usage of the audio feature training data to the chosen feature extraction pipeline. Moreover, modern deep learning-based approaches could reconstruct the original audio given such features.

BRIEF DESCRIPTION OF THE DRAWINGS

Like reference symbols in the various drawings indicate like elements.

DETAILED DESCRIPTION OF THE PREFERRED EMBODIMENTS

As discussed above, processing and storing audio encounter information and corresponding transcriptions for training a speech processing system or model present a security concern. For example, sensitive content may be obtained by a breach. For example, an internal actor could potentially scan lots of internal data (e.g., by looking for particular persons or classes of information, such as credit card numbers). However, just removing or obscuring sensitive content may result in degraded speech processing system performance.

As will be discussed in greater detail below, implementations of the present disclosure provide a technical solution necessarily rooted in computing technology to provide secure data augmentation for training of speech processing systems or models. Specifically, implementations of the present disclosure may generate augmented speech signals that include the acoustic properties of the input signal while removing the sensitive content. In this manner, implementations of the present disclosure may extract acoustic properties from an input speech signal and may utilize text-to-speech and voice style transfer (VST) processing to generate an obscured or "de-identified" version of the input speech signal. The de-identified speech signal may be resynthesized and augmented with the acoustic properties of the input speech signal to facilitate high accuracy speech processing model training. Additionally, implementations of the present disclosure may allow for the generation of secure training data by performing data augmentations that represent varying acoustic properties without storing or simply removing sensitive content.

The details of one or more implementations are set forth in the accompanying drawings and the description below. Other features and advantages will become apparent from the description, the drawings, and the claims.

System Overview

Figure 1:
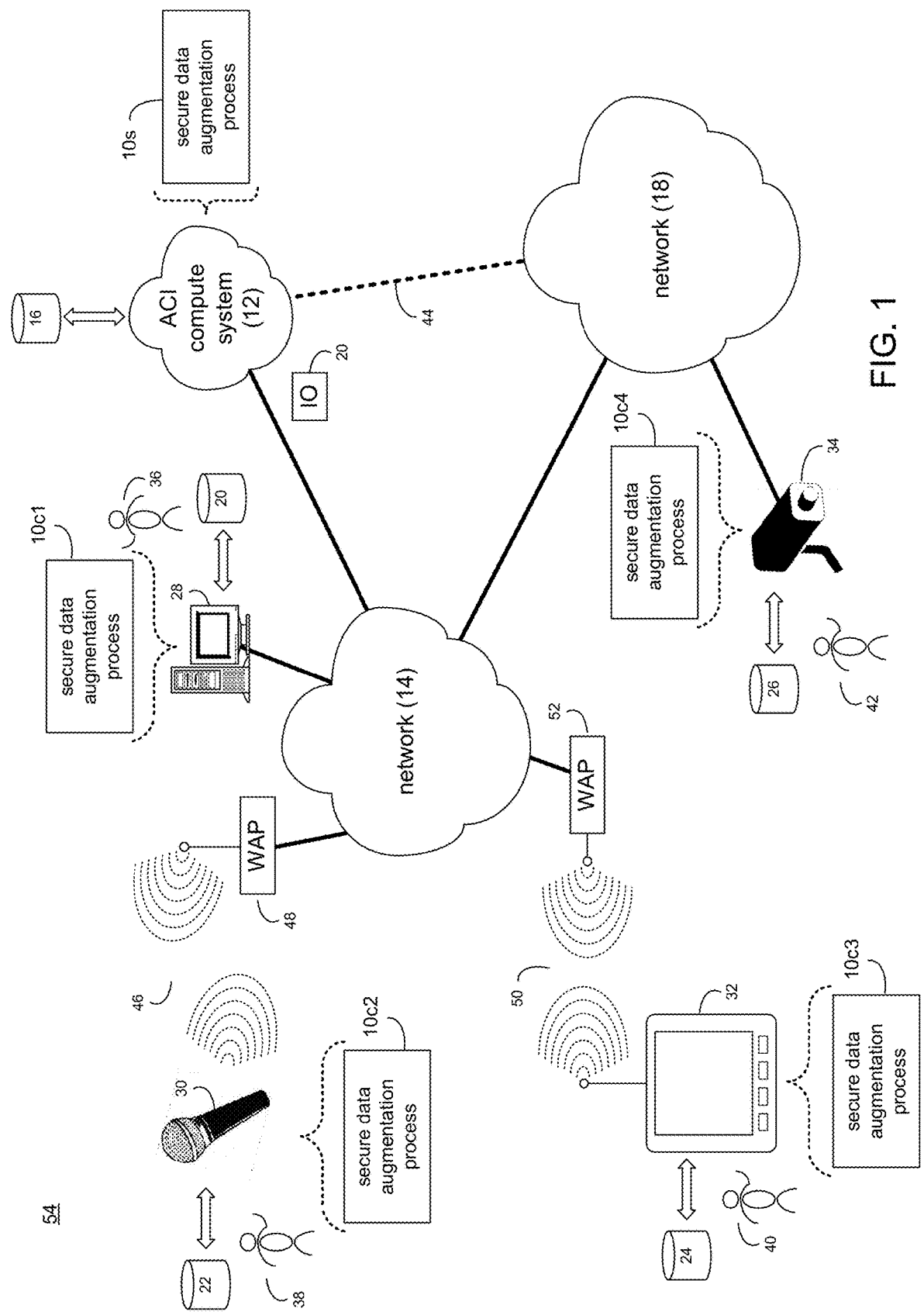
FIG. 1 is a diagrammatic view of an automated clinical documentation computer system and a secure data augmentation process coupled to a distributed computing network.

Referring to FIG. 1, there is shown secure data augmentation process 10. Secure data augmentation process 10 may be implemented as a server-side process, a client-side process, or a hybrid server-side/client-side process. For example, secure data augmentation process 10 may be implemented as a purely server-side process via secure data augmentation process 10s. Alternatively, secure data augmentation process 10 may be implemented as a purely client-side process via one or more of secure data augmentation process 10cl, secure data augmentation process 10c2, secure data augmentation process 10c3, and secure data augmentation process 10c4. Alternatively still, secure data augmentation process 10 may be implemented as a hybrid server-side/client-side process via secure data augmentation process 10s in combination with one or more of secure data augmentation process 10cl, secure data augmentation process 10c2, secure data augmentation process 10c3, and secure data augmentation process 10c4.

Accordingly, secure data augmentation process 10 as used in this disclosure may include any combination of secure data augmentation process 10s, secure data augmentation process 10cl, secure data augmentation process 10c2, secure data augmentation process 10c3, and secure data augmentation process 10c4.

Secure data augmentation process 10s may be a server application and may reside on and may be executed by automated clinical documentation (ACI) computer system 12, which may be connected to network 14 (e.g., the Internet or a local area network). ACI computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS)

systems, one or more Software as a Service (SaaS) systems, a cloud-based computational system, and a cloud-based storage platform.

As is known in the art, a SAN may include one or more of a personal computer, a server computer, a series of server computers, a mini computer, a mainframe computer, a RAID device and a NAS system. The various components of ACI computer system 12 may execute one or more operating systems, examples of which may include but are not limited to: Microsoft Windows Server™; Redhat Linux™, Unix, or a custom operating system, for example.

The instruction sets and subroutines of secure data augmentation process 10s, which may be stored on storage device 16 coupled to ACI computer system 12, may be executed by one or more processors (not shown) and one or more memory architectures (not shown) included within ACI computer system 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from secure data augmentation process 10s, secure data augmentation process 10c1, secure data augmentation process 10c2, secure data augmentation process 10c3 and/or secure data augmentation process 10c4 to ACI computer system 12. Examples of IO request 20 may include but are not limited to data write requests (i.e. a request that content be written to ACI computer system 12) and data read requests (i.e. a request that content be read from ACI computer system 12).

The instruction sets and subroutines of secure data augmentation process 10c1, secure data augmentation process 10c2, secure data augmentation process 10c3 and/or secure data augmentation process 10c4, which may be stored on storage devices 20, 22, 24, 26 (respectively) coupled to ACI client electronic devices 28, 30, 32, 34 (respectively), may be executed by one or more processors (not shown) and one or more memory architectures (not shown) incorporated into ACI client electronic devices 28, 30, 32, 34 (respectively). Storage devices 20, 22, 24, 26 may include but are not limited to: hard disk drives; optical drives; RAID devices; random access memories (RAM); read-only memories (ROM), and all forms of flash memory storage devices. Examples of ACI client electronic devices 28, 30, 32, 34 may include, but are not limited to, personal computing device 28 (e.g., a smart phone, a personal digital assistant, a laptop computer, a notebook computer, and a desktop computer), audio input device 30 (e.g., a handheld microphone, a lapel microphone, an embedded microphone (such as those embedded within eyeglasses, smart phones, tablet computers and/or watches) and an audio recording device), display device 32 (e.g., a tablet computer, a computer monitor, and a smart television), machine vision input device 34 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 36, 38, 40, 42 may access ACI computer system 12 directly through network 14 or through secondary network 18. Further, ACI computer system 12 may be connected to network 14 through secondary network 18, as illustrated with link line 44.

The various ACI client electronic devices (e.g., ACI client electronic devices 28, 30, 32, 34) may be directly or indirectly coupled to network 14 (or network 18). For example, personal computing device 28 is shown directly coupled to network 14 via a hardwired network connection. Further, machine vision input device 34 is shown directly coupled to network 18 via a hardwired network connection. Audio input device 30 is shown wirelessly coupled to network 14 via wireless communication channel 46 established between audio input device 30 and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between audio input device 30 and WAP 48. Display device 32 is shown wirelessly coupled to network 14 via wireless communication channel 50 established between display device 32 and WAP 52, which is shown directly coupled to network 14.

The various ACI client electronic devices (e.g., ACI client electronic devices 28, 30, 32, 34) may each execute an operating system, examples of which may include but are not limited to Microsoft Windows™, Apple Macintosh™, Redhat Linux™, or a custom operating system, wherein the combination of the various ACI client electronic devices (e.g., ACI client electronic devices 28, 30, 32, 34) and ACI computer system 12 may form modular ACI system 54.

Figure 2:
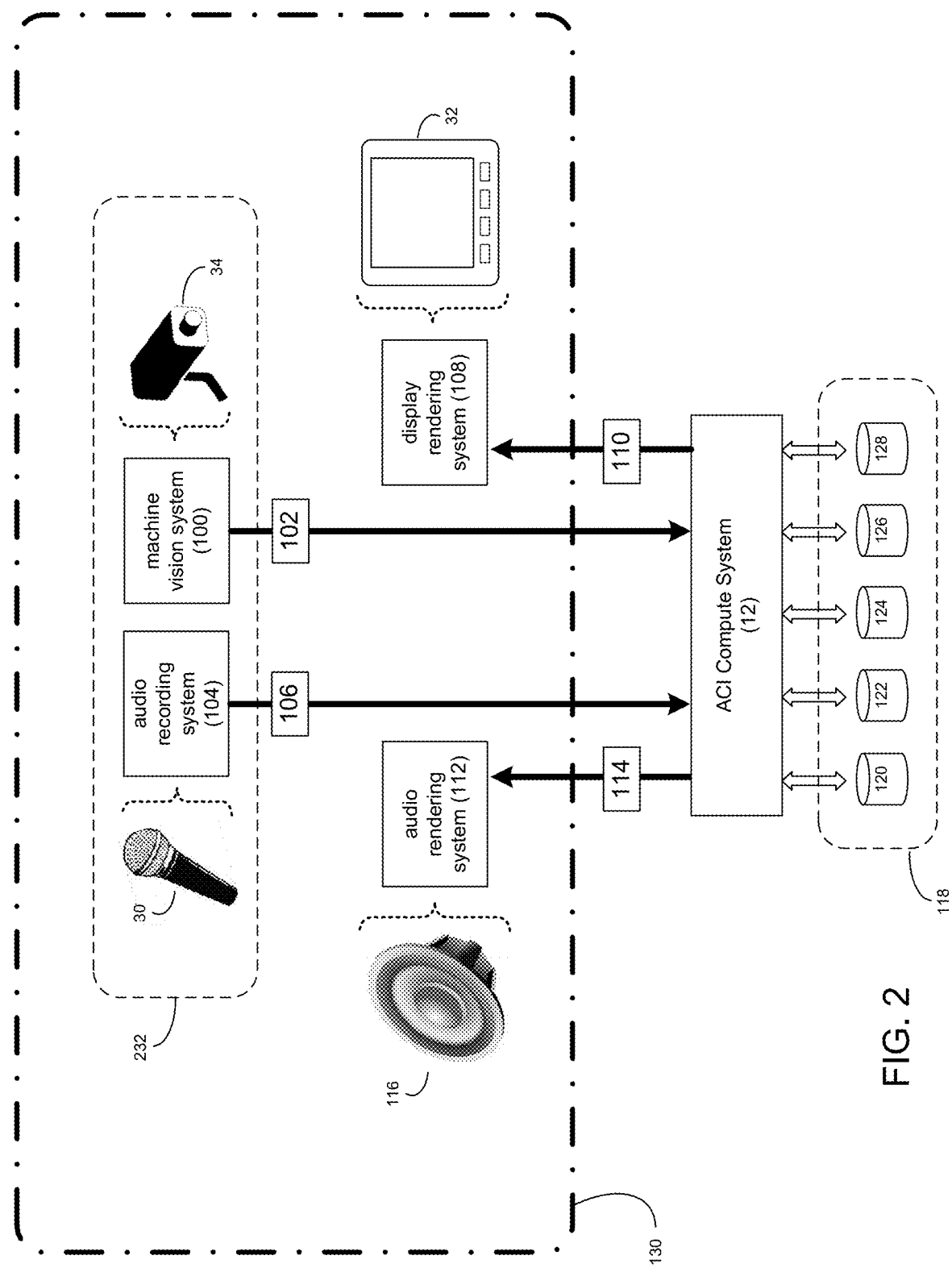
FIG. 2 is a diagrammatic view of a modular ACI system incorporating the automated clinical documentation computer system of FIG. 1.

Referring also to FIG. 2, there is shown a simplified example embodiment of modular ACI system 54 that is configured to automate clinical documentation. Modular ACI system 54 may include: machine vision system 100 configured to obtain machine vision encounter information 102 concerning a patient encounter; audio recording system 104 configured to obtain audio encounter information 106 concerning the patient encounter; and a computer system (e.g., ACI computer system 12) configured to receive machine vision encounter information 102 and audio encounter information 106 from machine vision system 100 and audio recording system 104 (respectively). Modular ACI system 54 may also include: display rendering system 108 configured to render visual information 110; and audio rendering system 112 configured to render audio information 114, wherein ACI computer system 12 may be configured to provide visual information 110 and audio information 114 to display rendering system 108 and audio rendering system 112 (respectively).

Example of machine vision system 100 may include but are not limited to: one or more ACI client electronic devices (e.g., ACI client electronic device 34, examples of which may include but are not limited to an RGB imaging system, an infrared imaging system, a ultraviolet imaging system, a laser imaging system, a SONAR imaging system, a RADAR imaging system, and a thermal imaging system). Examples of audio recording system 104 may include but are not limited to: one or more ACI client electronic devices (e.g., ACI client electronic device 30, examples of which may include but are not limited to a handheld microphone, a lapel microphone, an embedded microphone (such as those embedded within eyeglasses, smart phones, tablet computers and/or watches) and an audio recording device).

Examples of display rendering system 108 may include but are not limited to: one or more ACI client electronic devices (e.g., ACI client electronic device 32, examples of which may include but are not limited to a tablet computer, a computer monitor, and a smart television). Examples of audio rendering system 112 may include but are not limited to: one or more ACI client electronic devices (e.g., audio rendering device 116, examples of which may include but are not limited to a speaker system, a headphone system, and an earbud system).

As will be discussed below in greater detail, ACI computer system 12 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource. While in this particular example, five different examples of datasources 118, are shown, this is for illustrative purposes only and is not intended to be a limitation of this disclosure, as other configurations are possible and are considered to be within the scope of this disclosure.

As will be discussed below in greater detail, modular ACI system 54 may be configured to monitor a monitored space (e.g., monitored space 130) in a clinical environment, wherein examples of this clinical environment may include but are not limited to: a doctor's office, a medical facility, a medical practice, a medical lab, an urgent care facility, a medical clinic, an emergency room, an operating room, a hospital, a long term care facility, a rehabilitation facility, a nursing home, and a hospice facility. Accordingly, an example of the above-referenced patient encounter may include but is not limited to a patient visiting one or more of the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility).

Machine vision system 100 may include a plurality of discrete machine vision systems when the above-described clinical environment is larger or a higher level of resolution is desired. As discussed above, examples of machine vision system 100 may include but are not limited to: one or more ACI client electronic devices (e.g., ACI client electronic device 34, examples of which may include but are not limited to an RGB imaging system, an infrared imaging system, an ultraviolet imaging system, a laser imaging system, a SONAR imaging system, a RADAR imaging system, and a thermal imaging system). Accordingly, machine vision system 100 may include one or more of each of an RGB imaging system, an infrared imaging systems, an ultraviolet imaging systems, a laser imaging system, a SONAR imaging system, a RADAR imaging system, and a thermal imaging system.

Audio recording system 104 may include a plurality of discrete audio recording systems when the above-described clinical environment is larger or a higher level of resolution is desired. As discussed above, examples of audio recording system 104 may include but are not limited to: one or more ACI client electronic devices (e.g., ACI client electronic device 30, examples of which may include but are not limited to a handheld microphone, a lapel microphone, an embedded microphone (such as those embedded within eyeglasses, smart phones, tablet computers and/or watches) and an audio recording device). Accordingly, audio recording system 104 may include one or more of each of a handheld microphone, a lapel microphone, an embedded microphone (such as those embedded within eyeglasses, smart phones, tablet computers and/or watches) and an audio recording device.

Display rendering system 108 may include a plurality of discrete display rendering systems when the above-described clinical environment is larger or a higher level of resolution is desired. As discussed above, examples of display rendering system 108 may include but are not limited to: one or more ACI client electronic devices (e.g., ACI client electronic device 32, examples of which may include but are not limited to a tablet computer, a computer monitor, and a smart television). Accordingly, display rendering system 108 may include one or more of each of a tablet computer, a computer monitor, and a smart television.

Audio rendering system 112 may include a plurality of discrete audio rendering systems when the above-described clinical environment is larger or a higher level of resolution is desired. As discussed above, examples of audio rendering system 112 may include but are not limited to: one or more ACI client electronic devices (e.g., audio rendering device 116, examples of which may include but are not limited to a speaker system, a headphone system, or an earbud system). Accordingly, audio rendering system 112 may include one or more of each of a speaker system, a headphone system, or an earbud system.

ACI computer system 12 may include a plurality of discrete computer systems. As discussed above, ACI computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform. Accordingly, ACI computer system 12 may include one or more of each of a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

Figure 3:
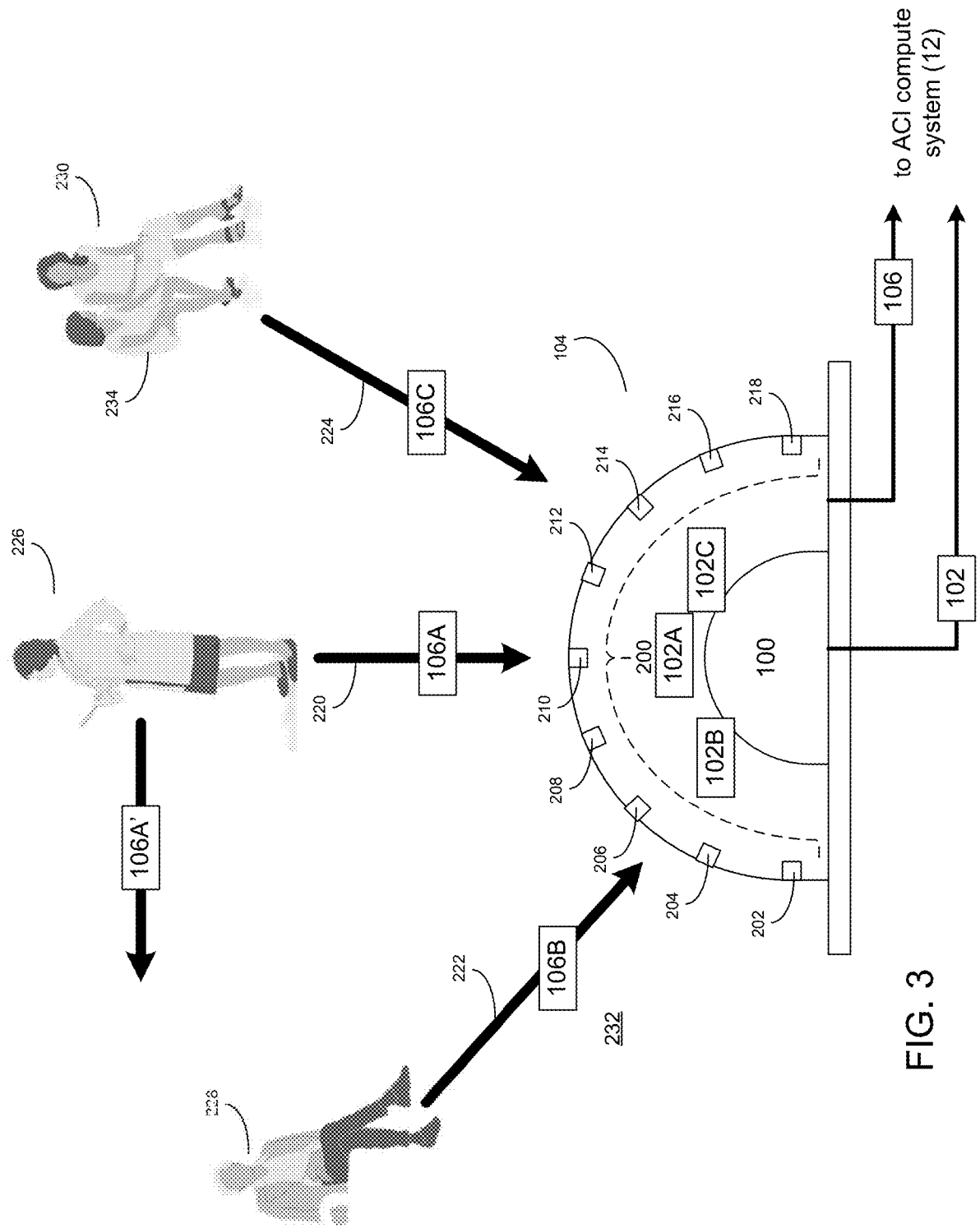
FIG. 3 is a diagrammatic view of a mixed-media ACI device included within the modular ACI system of FIG. 2.

Referring also to FIG. 3, audio recording system 104 may include directional microphone array 200 having a plurality of discrete microphone assemblies. For example, audio recording system 104 may include a plurality of discrete audio acquisition devices (e.g., audio acquisition devices 202, 204, 206, 208, 210, 212, 214, 216, 218) that may form microphone array 200. As will be discussed below in greater detail, modular ACI system 54 may be configured to form one or more audio recording beams (e.g., audio recording beams 220, 222, 224) via the discrete audio acquisition devices (e.g., audio acquisition devices 202, 204, 206, 208, 210, 212, 214, 216, 218) included within audio recording system 104.

For example, modular ACI system 54 may be further configured to steer the one or more audio recording beams (e.g., audio recording beams 220, 222, 224) toward one or more encounter participants (e.g., encounter participants 226, 228, 230) of the above-described patient encounter. Examples of the encounter participants (e.g., encounter participants 226, 228, 230) may include but are not limited to: medical professionals (e.g., doctors, nurses, physician's assistants, lab technicians, physical therapists, scribes (e.g., a transcriptionist) and/or staff members involved in the patient encounter), patients (e.g., people that are visiting the above-described clinical environments for the patient encounter), and third parties (e.g., friends of the patient, relatives of the patient and/or acquaintances of the patient that are involved in the patient encounter).

Accordingly, modular ACI system 54 and/or audio recording system 104 may be configured to utilize one or more of the discrete audio acquisition devices (e.g., audio acquisition devices 202, 204, 206, 208, 210, 212, 214, 216, 218) to form an audio recording beam. For example, modular ACI system 54 and/or audio recording system 104 may be configured to utilize audio acquisition device 210 to form audio recording beam 220, thus enabling the capturing of audio (e.g., speech) produced by encounter participant 226 (as audio acquisition device 210 is pointed to (i.e., directed toward) encounter participant 226). Additionally, modular ACI system 54 and/or audio recording system 104 may be configured to utilize audio acquisition devices 204, 206 to form audio recording beam 222, thus enabling the capturing of audio (e.g., speech) produced by encounter participant 228 (as audio acquisition devices 204, 206 are pointed to (i.e., directed toward) encounter participant 228). Additionally, modular ACI system 54 and/or audio recording system 104 may be configured to utilize audio acquisition devices 212, 214 to form audio recording beam 224, thus enabling the capturing of audio (e.g., speech) produced by encounter participant 230 (as audio acquisition devices 212, 214 are pointed to (i.e., directed toward) encounter participant 230). Further, modular ACI system 54 and/or audio recording system 104 may be configured to utilize null-steering precoding to cancel interference between speakers and/or noise.

As is known in the art, null-steering precoding is a method of spatial signal processing by which a multiple antenna transmitter may null multiuser interference signals in wireless communications, wherein null-steering precoding may mitigate the impact off background noise and unknown user interference.

In particular, null-steering precoding may be a method of beamforming for narrowband signals that may compensate for delays of receiving signals from a specific source at different elements of an antenna array. In general and to improve performance of the antenna array, in incoming signals may be summed and averaged, wherein certain signals may be weighted and compensation may be made for signal delays.

Machine vision system 100 and audio recording system 104 may be stand-alone devices (as shown in FIG. 2). Additionally/alternatively, machine vision system 100 and audio recording system 104 may be combined into one package to form mixed-media ACI device 232. For example, mixed-media ACI device 232 may be configured to be mounted to a structure (e.g., a wall, a ceiling, a beam, a column) within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility), thus allowing for easy installation of the same. Further, modular ACI system 54 may be configured to include a plurality of mixed-media ACI devices (e.g., mixed-media ACI device 232) when the above-described clinical environment is larger or a higher level of resolution is desired.

Modular ACI system 54 may be further configured to steer the one or more audio recording beams (e.g., audio recording beams 220, 222, 224) toward one or more encounter participants (e.g., encounter participants 226, 228, 230) of the patient encounter based, at least in part, upon machine vision encounter information 102. As discussed above, mixed-media ACI device 232 (and machine vision system 100/audio recording system 104 included therein) may be configured to monitor one or more encounter participants (e.g., encounter participants 226, 228, 230) of a patient encounter.

Specifically, machine vision system 100 (either as a stand-alone system or as a component of mixed-media ACI device 232) may be configured to detect humanoid shapes within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility). And when these humanoid shapes are detected by machine vision system 100, modular ACI system 54 and/or audio recording system 104 may be configured to utilize one or more of the discrete audio acquisition devices (e.g., audio acquisition devices 202, 204, 206, 208, 210, 212, 214, 216, 218) to form an audio recording beam (e.g., audio recording beams 220, 222, 224) that is directed toward each of the detected humanoid shapes (e.g., encounter participants 226, 228, 230).

As discussed above, ACI computer system 12 may be configured to receive machine vision encounter information 102 and audio encounter information 106 from machine vision system 100 and audio recording system 104 (respectively); and may be configured to provide visual information 110 and audio information 114 to display rendering system 108 and audio rendering system 112 (respectively). Depending upon the manner in which modular ACI system 54 (and/or mixed-media ACI device 232) is configured, ACI computer system 12 may be included within mixed-media ACI device 232 or external to mixed-media ACI device 232.

As discussed above, ACI computer system 12 may execute all or a portion of secure data augmentation process 10, wherein the instruction sets and subroutines of secure data augmentation process 10 (which may be stored on one or more of e.g., storage devices 16, 20, 22, 24, 26) may be executed by ACI computer system 12 and/or one or more of ACI client electronic devices 28, 30, 32, 34.

The Secure Data Augmentation Process:

As discussed above, processing and storing audio encounter information and corresponding transcriptions for training a speech processing system or model present a security concern. For example, sensitive content may be obtained by a breach. For example, an internal actor could potentially scan lots of internal data (e.g., by looking for particular persons or classes of information, such as credit card numbers). However, just removing or obscuring sensitive content may result in degraded speech processing system performance during training.

As will be discussed in greater detail below, implementations of the present disclosure provide a technical solution necessarily rooted in computing technology to provide secure data augmentation for training of speech processing systems or models. Specifically, implementations of the present disclosure may generate augmented speech signals that include the acoustic properties of the input signal while removing the sensitive content. In this manner, implementations of the present disclosure may extract acoustic properties from an input speech signal and may utilize text-to-speech and voice style transfer (VST) processing to generate an obscured or "de-identified" version of the input speech signal. The de-identified speech signal may be resynthesized and augmented with the acoustic properties of the input speech signal to facilitate high accuracy speech processing model training. Additionally, implementations of the present disclosure may allow for the generation of secure training data by performing data augmentations that represent varying acoustic properties without storing or simply removing sensitive content.

Figure 4:
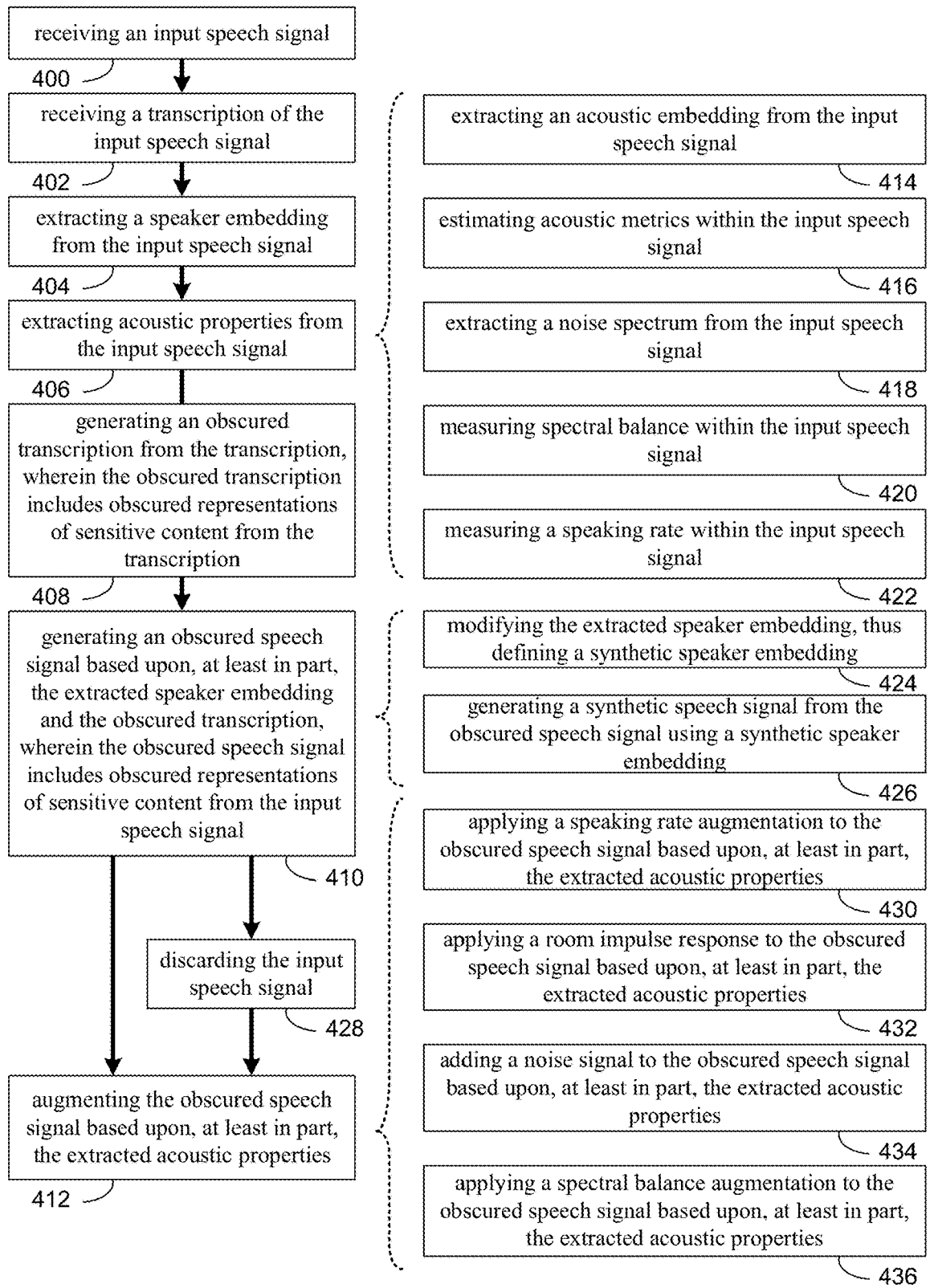
FIG. 4 is a flow chart of one implementation of the secure data augmentation process of FIG. 1.
Figure 5:
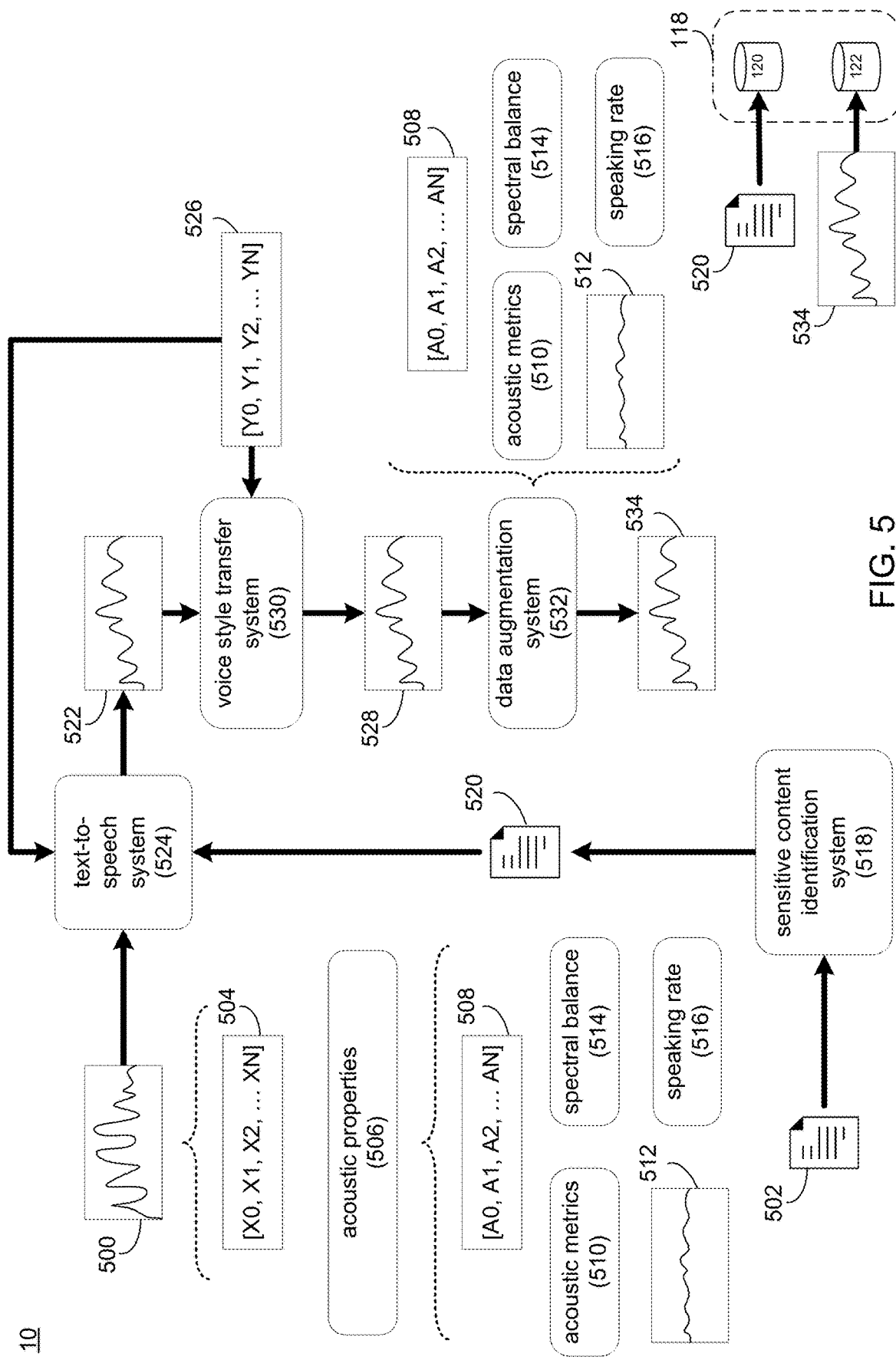
FIGS. 5-6 are diagrammatic views of the secure data augmentation process of FIG. 1.
Figure 6:
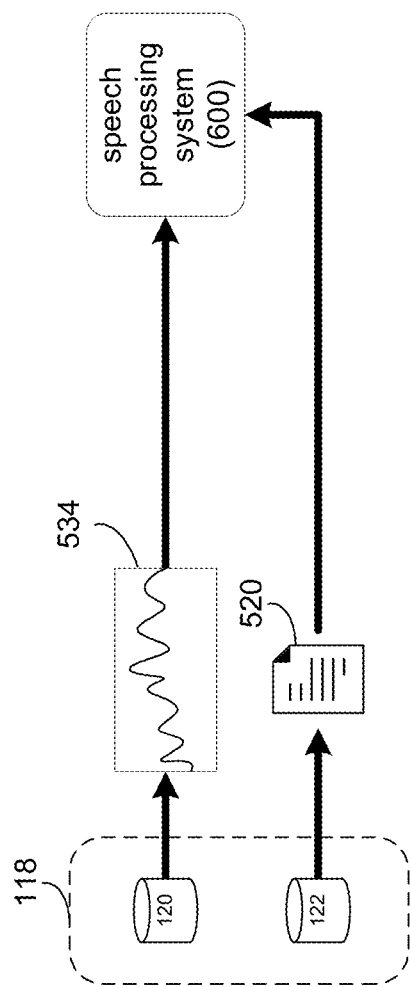

Referring also at least to FIGS. 4-6, secure data augmentation process 10 may receive 400 an input speech signal. A transcription of the input speech signal may be received 402. A speaker embedding may be extracted 404 from the input speech signal. Acoustic properties from the input speech signal may be extracted 406. An obscured transcription may be generated 408 from the transcription, where the obscured transcription includes obscured representations of sensitive content from the transcription. An obscured speech signal may be generated 410 based upon, at least in part, the extracted speaker embedding and the obscured transcription, where the obscured speech signal includes obscured representations of sensitive content from the input speech signal. The obscured speech signal may be augmented 412 based upon, at least in part, the extracted acoustic properties.

In some implementations, secure data augmentation process 10 may receive 400 an input speech signal. For example and as discussed above, an audio recording system (e.g., audio recording system 104) may receive and record an input speech signal. Referring also to FIG. 5, secure data augmentation process 10 may receive an input speech signal (e.g., input speech signal 500). In one example, input speech signal 500 may be received and recorded by an audio recording system (e.g., audio recording system 104) and/or may be a previously recorded audio input signal (e.g., an audio signal stored in a database or other data structure). In one example, suppose that input speech signal 500 concerns a medical encounter between a medical professional (e.g., participant 226) and a patient (e.g., participant 228). In this example, the patient (e.g., participant 228) may be asked by the medical professional (e.g., participant 226) to audibly confirm personal identification information (e.g., name, date of birth, marital status, etc.) during a medical examination. Additionally, the patient (e.g., participant 228) may describe personal health information (e.g., symptoms, medical history, etc.). Accordingly, input speech signal 500 may include sensitive content.

In some implementations, secure data augmentation process 10 may receive 402 a transcription of the input speech signal. For example, secure data augmentation process 10 may provide the input speech signal (e.g., input speech signal 500) to an automatic speech recognition (ASR) system or other speech processing system to generate a transcription (e.g., transcription 502) of the input speech signal (e.g., input speech signal 500). As is known in the art, automated speech recognition systems may convert input speech signals to output text. Accordingly, the ASR system may automatically generate transcription 502 of input speech signal 500. As will be discussed in greater detail below, transcription 502 may include any sensitive content information recorded in input speech signal 500.

In some implementations, secure data augmentation process 10 may extract 404 a speaker embedding from the input speech signal. As is known in the art, a speaker embedding may generally include a representation a speaker's identity (e.g., a vector of fixed size) regardless of the length of an input speech signal. A speaker embedding may be generated in various ways. For example and as known in the art, secure data augmentation process 10 may perform feature extraction by building a supervised deep neural network (DNN), operating at the frame level, to classify speakers in a development set. The input of this background network may be formed by stacking each training frame with its left and right context frames. The number of outputs corresponds to the number of speakers in the development set, N. The target labels may be formed as a 1-hot N-dimensional vector where the only non-zero component is the one corresponding to the speaker identity. Once the DNN has been trained successfully, the accumulated output activations of the last hidden layer may be used as a new speaker representation or speaker embedding. That is, for every frame of the obscured speech signal belonging to a new speaker, the output activations of the last hidden layer may be computed using standard feedforward propagation in the trained DNN, and then those activations may be accumulated to form a new compact representation of that speaker, the speaker embedding. In this example, the speaker embedding may be referred to as a "d-vector". However, it will be appreciated that various types of speaker embeddings may be extracted from the obscured speech signal within the scope of the present disclosure.

Referring again to the example of FIG. 5, secure data augmentation process 10 may extract 402, for each segment of the input speech signal (e.g., input speech signal 500) and for each speaker (e.g., participant 226 and/or participant 228), a speaker embedding (e.g., speaker embedding 504). In some implementations, speaker embedding 504 may be a d-vector that represents the average activations from a last hidden layer of a DNN. In this manner, secure data augmentation process 10 may utilize speaker embedding 504 to represent the speech characteristics of a particular participant (e.g., participant 226 or participant 228).

In some implementations, secure data augmentation process 10 may extract 406 acoustic properties from the input speech signal. Acoustic properties may generally include various signal characteristics that define and/or impact speech signals. For example, acoustic properties (e.g., acoustic properties 506) may include noise properties, reverberation properties, speaking rate properties, spectral balance properties, and other properties. As will be discussed in greater detail below, acoustic properties 506 may impact the performance of speech processing systems. For example, suppose input speech signal 500 has a low signal-to-noise ratio (SNR). In this example, a speech processing system may provide less accurate speech processing (i.e., measured in terms of word error rate or other relevant performance metrics). Accordingly, secure data augmentation process 10 may utilize acoustic properties extracted from the input speech signal to augment obscured speech signal, thus removing sensitive content while retaining acoustic properties of the input signal that are lost when obscuring the input speech signal.

In some implementations, extracting 406 the acoustic properties from the input speech signal may include extracting 414 an acoustic embedding from the input speech signal. For example, an acoustic embedding may be a vector or other data structure that represents various background acoustics measured over one or more short time frames. As shown in FIG. 5, an acoustic embedding (e.g., acoustic embedding 508) may be extracted that represents background acoustics for a particular frame or segment of input speech signal 500. Acoustic embedding 508 may be generated by isolating the speech content from input speech signal 500 and representing the remaining signal as a vector or other data structure. In one example, a Non-Intrusive Speech Assessment (NISA) system may be used to extract acoustic embedding 508 from input speech signal 500. As is known in the art, a NISA system is a multi-task machine learning framework for non-intrusive acoustic parameter estimation that includes voice activity detection (VAD), C50 (i.e., the ratio of the early sound energy (between 0 and 50 milliseconds) and the late sound energy (that arrives later than 50 milliseconds) in a room impulse response (RIR)), Perceptual Evaluation of Speech Quality (PESQ), and segmental SNR which is able to reliably estimate a number of parameters in short windows of length 300 milliseconds using the multi-task training paradigm. While an example of a NISA system has been described for extracting 406 acoustic embedding 508, it will be appreciated that this is for example purposes only and that various known methodologies may be utilized within the scope of the present disclosure.

Extracting 406 the acoustic properties from the input speech signal may include estimating 416 acoustic metrics within the input speech signal. For example and instead of, or in addition to, extracting acoustic embedding 508, secure data augmentation process 10 may estimate 416 particular acoustic metrics (e.g., acoustic metrics 510) from the input speech signal. Secure data augmentation process 10 may utilize a NISA system to estimate various acoustic metrics such as reverberation time (i.e., the time in seconds required for the level of the sound to drop 60 dB after the sound source is turned off); C50 (i.e., speech clarity measured as the ratio of the early sound energy (between 0 and 50 milliseconds) and the late sound energy (that arrives later than 50 milliseconds)); signal-to-noise ratio (SNR); a bit rate; gain (i.e., sound strength); etc. measured over short time frames or segments. For example, the length or duration of each frame or segment may be predefined and/or user-defined. While an example of a NISA system has been described for estimating 416 acoustic metrics 510, it will be appreciated that this is for example purposes only and that various known methodologies may be utilized within the scope of the present disclosure.

In some implementations, extracting 406 the acoustic properties from the input speech signal may include extracting 418 a noise spectrum from the input speech signal. A noise spectrum may generally include a representation of the spectral characteristics or distribution of noise within input speech signal 500. For example, using a noise spectral estimator, secure data augmentation process 10 may extract 418 the background noise spectrum (e.g., noise spectrum 512) as a waveform or numerical representation of the noise spectrum (e.g., a distribution or vector of noise components within input speech signal 500). As is known in the art, a noise spectral estimator may include a system or model that is configured to, at least in one example, obtain a noise spectrum (e.g., noise spectrum 512) by e.g., averaging past spectral power values, using a time-varying frequency-dependent smoothing parameter that is adjusted by a signal presence probability. While one example of a noise spectral estimator has been described, it will appreciated that this is for example purposes only and that various methodologies, systems, or models may be utilized to extract 418 noise spectrum 512 from input speech signal 500 within the scope of the present disclosure.

Extracting 406 the acoustic properties from the input speech signal may include measuring 420 spectral balance within the input speech signal. For example, secure data augmentation process 10 may measure 420 the level changes and spectral balance (e.g., spectral balance 514) for each frame or segment of input speech signal 500. Spectral balance (e.g., spectral balance 514) may include the distribution of levels of each frequency region within the signal. Measuring 420 spectral balance 514 may include measuring or determining the average speech spectrum for segments of input signal 500 and comparing the measured average speech spectrum with the long term average speech spectra (LTASS) and/or the long term spectrum shape. For example and as is known in the art, LTASS shows the level of each frequency region within the signal and is measured by filtering the speech in frequency bands with a width of e.g., one-third octaves. The averaged levels of the speech signal in all filters for durations of several seconds or minutes may define this specific spectrum. While one example for measuring spectral balance 514 has been described using LTASS, it will appreciated that this is for example purposes only and that various methodologies, systems, or models may be utilized to measure 420 spectral balance 514 within input speech signal 500 within the scope of the present disclosure.

In some implementations, extracting 406 the acoustic properties from the input speech signal may include measuring 420 a speaking rate within the input speech signal. A speaking rate (e.g., speaking rate 516) may generally include the rate of speech or speaking within a segment or portion of a speech signal (e.g., input speech signal 500). Secure data augmentation process 10 may utilize a speaking rate estimator to measure 420 speaking rate 516. A speaking rate estimator may include a model or system configured to, at least in one example, count the number of phonetic elements per second or other unit of time. While one example of measuring a speaking rate using a speaking rate estimator has been described, it will appreciated that this is for example purposes only and that various methodologies, systems, or models may be utilized to measure 420 speaking rate 516 from input speech signal 500 within the scope of the present disclosure.

In some implementations, secure data augmentation process 10 may generate 408 an obscured transcription from the transcription, wherein the obscured transcription includes obscured representations of sensitive content from the transcription. For example, secure data augmentation process 10 may identify one or more sensitive content portions from the transcription of the input speech signal. Sensitive content portions may generally include any pieces or types of information that are personal, private, or subject to confidentiality. For example, the one or more sensitive content portions may include one or more of personally identifiable information (PII) and protected health information (PHI). In addition to PII and PHI, sensitive content portions may include financial information, intellectual property, trade secrets, and/or information declared private by law or regulation. Accordingly, it will be appreciated that secure data augmentation process 10 may identify various types of information as sensitive content within the scope of the present disclosure.

For example, secure data augmentation process 10 may utilize a sensitive content identification system (e.g., sensitive content identification system 518) to identify one or more sensitive content portions within the transcription (e.g., transcription 502). Sensitive content identification system 518 may include various known components such as natural language understanding (NLU) systems, artificial intelligence/machine learning models, predefined detection rules, etc. for identifying one or more sensitive content portions from within the transcription. Secure data augmentation process 10 may provide a user interface, database, and/or other data structure of examples and/or rules for identifying sensitive content within a transcription.

Generating 408 the obscured transcription may generally include "obscuring" the one or more sensitive content portions from the transcription. For example, secure data augmentation process 10 may obscure the sensitive content by replacing, modifying, and/or removing the sensitive content portions from the transcription. For example, secure data augmentation process 10 may utilize various known components such as natural language understanding (NLU) systems, artificial intelligence/machine learning models, predefined detection rules, etc. for obscuring (i.e., substituting and/or removing) particular portions of sensitive content. Obscuring the one or more sensitive content portions from the transcription may include changing personally identifiable information (PII) and/or protected health information (PHI). For example, secure data augmentation process 10 may include rules for replacing particular types of sensitive content with similar types of content. In this manner, secure data augmentation process 10 may obscure sensitive content particular to individuals associated with a particular input speech signal.

In some implementations, secure data augmentation process 10 may generate the obscured transcription and, as will be discussed in greater detail below, the obscured speech signal by processing the transcription and corresponding portion of the input speech signal in segments. For example, secure data augmentation process 10 may process each segment of input speech signal 500 and transcription 502 associated with a particular speaker. For example, secure data augmentation process 10 may utilize a speaker identification system (e.g., a speaker verification system or speaker recognition system) to identify particular speakers in an input speech signal. As will be discussed in greater detail below, acoustic properties of a speaker's voice may be represented as a speaker embedding. Secure data augmentation process 10 may identify one or more speakers from input speech signal 500 by extracting speaker embeddings for distinct speakers.

Additionally, transcription 502 may include predefined speaker tags indicating conversational data (i.e., text) that is attributable to a particular speaker (e.g., during an encounter between various encounter participants as shown in FIG. 3). In this manner, secure data augmentation process 10 may generate 408 the obscured transcription (e.g., obscured transcription 520) by processing segments of text of the transcription. For example, a segment may be a predefined amount of text and/or amount of corresponding speech signal. In another example, a segment may represent a portion of text and/or corresponding speech signal associated with a particular speaker. In this example, a first segment may include a portion of the transcription associated with a particular speaker while a second segment may include another portion of the transcription that is associated with another speaker. In some implementations, a segment may be defined as a sensitive content portion. For example, in response to identifying sensitive content within the transcription, secure data augmentation process 10 may define a segment for each sensitive content portion. While various examples have been described about how a segment may be defined, it will be appreciated that the segment may include any fixed or dynamic length or amount of content from the transcription and/or the input speech signal within the scope of the present disclosure.

Suppose that secure data augmentation process 10 identifies various sensitive content portions from transcription 502. In this example, suppose secure data augmentation process 10 identifies the doctor's name (e.g., "Sam"). In this example, secure data augmentation process 10 may obscure the doctor's name (e.g., replacing "Sam" with "Mark"). Similarly, secure data augmentation process 10 may obscure e.g., a patient's date of birth (e.g., replacing "Jun. 12, 1983" with "Nov. 1, 1985"); and/or other various sensitive content (e.g., a patient's medical history/prescription dosage information, an individual's financial information, a participant's address, etc.). Secure data augmentation process 10 may output these obscured sensitive data portions in the form of an obscured transcription (e.g., obscured transcription 520). In some implementations, for non-sensitive content portions, secure data augmentation process 10 may utilize the text of the transcription without performing any modifications. For sensitive content, secure data augmentation process 10 may obscure those sensitive content portions by replacing or modifying the original text of the transcription. In this manner, secure data augmentation process 10 may generate obscured transcription 520 by processing each segment of original transcription 502 individually for sensitive content. While several examples of obscuring sensitive content portions has been described above, it will be appreciated that any combination of sensitive content portions may be obscured by secure data augmentation process 10 within the scope of the present disclosure.

In some implementations, secure data augmentation process 10 may generate 410 an obscured speech signal based upon, at least in part, the extracted speaker embedding and the obscured transcription, wherein the obscured speech signal includes obscured representations of sensitive content from the input speech signal. For example, secure data augmentation process 10 may generate 410 an obscured speech signal with speech content for modified portions of the obscured transcription relative to the original transcription. For example, an obscured speech signal (e.g., obscured speech signal 522) may be generated using a text-to-speech (TTS) system (e.g., TTS system 524) configured to convert obscured representations of the obscured transcription (e.g., transcription 520) into an obscured speech signal (e.g., obscured speech signal 522). As discussed above, secure data augmentation process 10 may generate an obscured speech signal corresponding to particular segments of the obscured transcription. For example, secure data augmentation process 10 may use TTS system 524 to replace the speech signal portions including sensitive content with a synthesized representation of those sensitive content portions.

For example, secure data augmentation process 10 may identify a class for each sensitive content portion (e.g., age, gender, date, time, location, etc.). Secure data augmentation process 10 may replace the sensitive content portion with a class identifier or tag. For example, if transcription 502 states "Sam has an appointment", secure data augmentation process 10 may identify "Sam" as PII and as PHI. In this example, secure data augmentation process 10 may access one or more datasources (e.g., datasources 118) to identify the class or classes for each sensitive content portion in the transcription and the input speech signal. In response to identifying and replacing each sensitive content portion with a corresponding class identifier, secure data augmentation process 10 may access a dictionary or other database of candidate phrases to use as a replacement for the class identifier. Secure data augmentation process 10 may replace each class identifier with one or more candidate phrases from the database of candidate phrases.

Continuing with the above example, suppose that obscured transcription 520 includes an obscured representation of the doctor's name (e.g., "Sam" has been replaced with "Mark") and an obscured representation of the patient's date of birth (e.g., "Jun. 12, 1983" has been replaced with "Nov. 1, 1985"). In this example, secure data augmentation process 10 may use TTS system 524 to generate obscured speech representations of "Mark" and "Nov. 1, 1985". While an example with two obscured portions has been described, it will be appreciated that this is for example purposes only and that any number of obscured representations may be processed by TTS system 524 within the scope of the present disclosure.

In some implementations, generating 410 an obscured speech signal based upon, at least in part, the extracted speaker embedding and the obscured transcription may include modifying 424 the extracted speaker embedding, thus defining a synthetic speaker embedding. A synthetic speaker embedding may represent the speech characteristics of another person or an artificially created speaker embedding that is useable for generating and storing speech signals. For example, a speaker embedding (e.g., speaker embedding 504) may be directly or sufficiently attributable to a particular person and, as such, may constitute sensitive content (i.e., PII). In this example, a synthetic speaker embedding (e.g., synthetic speaker embedding 526) may represent a licensed or otherwise useable speaker embedding that may be used for generating synthetic speech signals without comprising PII. As such, the term "synthetic" may represent any speaker embedding that does not constitute sensitive content (i.e., PII that is attributable to a known person but used without their consent). For example, various laws and regulations limit the amount of PII or PHI that can be stored or utilized in speech processing. As such, synthetic speaker embedding 526 may represent a legally compliant speaker embedding that can be used to generate synthetic speech signals.

In some implementations, TTS system 524 may be a single speaker TTS system or a multi-speaker TTS system. A single speaker TTS system is a TTS system trained to output an obscured speech signal corresponding to a single synthetic speaker embedding. By contrast, a multi-speaker TTS system may have access to a plurality of candidate synthetic speaker embeddings. In some implementations, secure data augmentation process 10 may select synthetic speaker embedding 526 by comparing extracted speaker embedding 504 to a plurality of candidate synthetic speech embeddings. For example, secure data augmentation process 10 may ensure that the synthetic speaker embedding is sufficiently different from the original speaker embedding. In one example, secure data augmentation process 10 may determine the distance between the extracted speaker embedding and each synthetic speaker embedding and may select a synthetic speaker embedding based upon a predefined threshold. For example, a threshold may be defined such that the difference between the extracted speaker embedding and the selected synthetic speaker embedding is greater than or equal to the threshold. While one example has been described for selecting a synthetic speaker embedding, it will be appreciated various methodologies may be used to select the synthetic speaker embedding within the scope of the present disclosure.

In some implementations, modifying 424 the extracted speaker embedding may include modifying the extracted speaker embedding until a speaker verification is unable to verify a speaker's identity using the synthetic speaker embedding. For example, secure data augmentation process 10 may utilize a speaker embedding modification system or model to modify the extracted speaker embedding (e.g., speaker embedding 504) to generate synthetic speaker embedding. The speaker embedding modification system may be a system or model configured to modify the original speaker embedding so that the synthetic speaker embedding does not sound like the original speaker (e.g., as defined by the extracted speaker embedding). In one example, speaker embedding modification system may perform a vector operation that directly modifies extracted speaker embedding 504 to output synthetic speaker embedding 526. In another example, the speaker embedding modification system may modify the original speaker embedding so that a speaker verification system is no longer able to identify the obscured speech signal from the new speaker embedding as that of the original speaker embedding.

In this example, the speaker embedding modification system may be a trained neural network system that takes the extracted speaker embedding (e.g., extracted speaker embedding 504) as input along with some audio (e.g., synthesized TTS utterance with the original speaker embedding or via a voice style transfer (VST) system) and outputs e.g., a vector which when multiplied by the extracted speaker embedding creates an embedding sufficiently different so as to 'fool' a speaker verification system. While two examples of modifying the extracted speaker embedding to generate the synthetic speaker embedding have been discussed, it will be appreciated that these are for example purposes only and that various modifications may be made to the extracted speaker embedding to generate a synthetic speaker embedding within the scope of the present disclosure.

In some implementations, secure data augmentation process 10 may generate 426 a synthetic speech signal using the synthetic speaker embedding. A synthetic speech signal may include a representation of the obscured speech signal generated with a voice style transfer system or other speech-to-speech system. For example, secure data augmentation process 10 may process the obscured speech signal using a VST system with a synthetic speaker embedding to generate a synthetic speech signal (e.g., synthetic speech signal 528). For example and as is known in the art, a VST system synthesizes speech from one source speaker to a different target speaker while keeping the linguistic and speech style the same. Secure data augmentation process 10 may utilize various known VST systems (e.g., neural networks, generative adversarial networks (GANs), etc.) for VST system 530. VST system 530 may generate synthetic speech signal 528 using synthetic speaker embedding 526. For example, VST system 530 may utilize synthetic speaker embedding 526 to modify the various acoustic properties or features of obscured speech signal 522 to generate synthetic speech signal 528 that has the speech characteristics of the synthetic speaker embedding. In this manner, synthetic speech signal 528 may sound as if it were spoken by the same speaker associated with synthetic speaker embedding 526. As such, synthetic speech signal 528 may represent a secure version of input speech signal 500 without any sensitive content (e.g., PII or PHI).

In some implementations, secure data augmentation process 10 may discard 428 the input speech signal in response to generating the obscured speech signal. For example, with obscured speech signal 522 and obscured transcription 520, the original speech signal (e.g., input speech signal 500) may be discarded 428. As discussed above and in some implementations, secure data augmentation process 10 may generate obscured speech signal 522 and obscured transcription 520 on a segment-by-segment basis. Accordingly, secure data augmentation process 10 may discard 428 of input speech signal 500 on a segment-by-segment basis as corresponding portions of obscured speech signal 522 and obscured transcription 520 are generated.

In some implementations, secure data augmentation process 10 may augment 412 the obscured speech signal based upon, at least in part, the extracted acoustic properties. For example and as discussed above, when generating 410 obscured speech signal 522 and/or synthetic speech signal 528, secure data augmentation process 10 may utilize TTS system 524 and/or VST system 530 to obscure sensitive content. However, obscured speech signal 522 and/or synthetic speech signal 528 may, as a function of the processing by TTS system 524 and/or VST system 530, be anechoic as all acoustic properties are removed (e.g., noise and reverberation-free speech signal). Training a speech processing system using obscured speech signal 522 and/or synthetic speech signal 528 may result in degraded speech processing performance because the training data is anechoic and is missing these acoustic properties that can heavily influence the accuracy of the speech processing system.

Secure data augmentation process 10 may augment 412 the obscured speech signal to include various acoustic properties based upon, at least in part, the extracted acoustic properties. For example, secure data augmentation process 10 may utilize extracted acoustic properties 506 to reconstruct the acoustic properties of input speech signal 500 without exposing sensitive content from input speech signal 500. Additionally and/or alternatively, secure data augmentation process 10 may also augment 412 obscured speech signal 522 and/or synthetic speech signal 528 to include a variety or range of acoustic properties based upon, at least in part, the extracted acoustic properties. In this manner, a speech processing system may be trained with more diverse training data in terms of acoustic properties. In another example, secure data augmentation process 10 may generate augmented training data by generating multiple obscured transcriptions (e.g., obscured transcription 520) with various surrogates or candidate phrases to use as a replacement for each sensitive content portion or identified class identifier. Secure data augmentation process 10 may replace each class identifier with various candidate phrases from the database of candidate phrases across multiple copies or versions of obscured transcription 520 to generate augmented training data.

In some implementations, augmenting 412 the obscured speech signal based upon, at least in part, the extracted acoustic properties may include applying 430 a speaking rate augmentation to the obscured speech signal based upon, at least in part, the extracted acoustic properties. For example, suppose that during the generation of obscured speech signal 522 and/or synthetic speech signal 528, TTS system 524 and/or VST system 530 adjusts the speaking rate of the speech signal. In this example, secure data augmentation process 10 may apply 430 a speaking rate augmentation by resampling obscured speech signal 522 to speed up or slow down the obscured speech signal. This is shown in FIG. 5 with data augmentation system 532. Data augmentation system 532 may represent any signal processing system or model configured to perform any of the data augmentations of obscured speech signal 522 and/or synthetic speech signal 528 that will be discussed hereafter. In another example, secure data augmentation process 10 may apply 430 a speaking rate augmentation by modifying speaking rate with pitch correction (PSOLA). As is known in the art, PSOLA may include dividing obscured speech signal 522 into small overlapping segments. To change the pitch of the signal, the segments are moved further apart (e.g., to decrease the pitch) or closer together (e.g., to increase the pitch). To change the duration of the signal, the segments are then repeated multiple times (e.g., to increase the duration) or some are eliminated (e.g., to decrease the duration). The segments are then combined using the overlap add technique. In some implementations, PSOLA may provide a more high quality augmentation when compared to resampling.

Suppose that extracted speaking rate 516 indicates a speaking rate of e.g., 160 words per minute. Further suppose that during the obscuring of input speech signal, TTS system 524 and/or VST system 530 generates obscured speech signal 522 with e.g., a slower speaking rate (e.g., 130 words per minute). In one example, secure data augmentation process 10 may apply 430 a speaking rate augmentation on obscured speech signal 522 to generate augmented speech signal 534 by resampling obscured speech signal. In this example, the speaking rate of obscured speech signal 522 may be increased until it is approximately equivalent to speaking rate 516. "Approximately equivalent" may be based upon a threshold (e.g., within 10% of speaking rate 516±2%) where the threshold may be predefined and/or user-defined. In another example, secure data augmentation process 10 may apply 430 a speaking rate augmentation on obscured speech signal 522 to generate augmented speech signal 534 by performing PSOLA. In this example, secure data augmentation process 10 may adjust the pitch and/or duration of obscured speech signal 522 to be approximately equivalent to speaking rate 516. While two examples have been provided for applying a speaking rate augmentation on obscured speech signal 522, it will be appreciated that these are for example purposes only.

Augmenting 412 the obscured speech signal based upon, at least in part, the extracted acoustic properties may include applying 432 a room impulse response to the obscured speech signal based upon, at least in part, the extracted acoustic properties. For example, suppose that during the generation of obscured speech signal 522 and/or synthetic speech signal 528, TTS system 524 and/or VST system 530 adjusts reverberation properties of the speech signal. In this example, secure data augmentation process 10 may apply 432 a room impulse response to obscured speech signal 522. For example, secure data augmentation process 10 may simulate appropriate room impulse response and/or select a room impulse response from previous measurements. In one example where obscured speech signal 522 is a time-domain signal, obscured speech signal 522 may be convolved with the room impulse response to generate augmented speech signal 534 that includes the reverberation properties defined in acoustic embedding 508 and/or acoustic metrics 510. In another example where obscured speech signal 522 is a frequency-domain signal, obscured speech signal 522 may be multiplied with the acoustic transfer function (i.e., a mapping of one or more speech signal characteristics from one device/acoustic domain to another device/acoustic domain) to generate augmented speech signal 534 that includes the reverberation properties defined in acoustic embedding 508 and/or acoustic metrics 510.

Suppose that extracted reverberation indicates that input speech signal 500 is recorded in a large, hollow room.

Further suppose that during the obscuring of input speech signal 500, TTS system 524 and/or VST system 530 generates obscured speech signal 522 with e.g., an anechoic properties (i.e., no reverberation). In this example, the reverberation properties of obscured speech signal 522 may be increased (e.g., by simulating a room impulse response corresponding to the large, hollow room from extracted reverberation of acoustic embedding 508 and/or acoustic metrics 510) and applying 432 the room impulse response to obscured speech signal 522 until it is approximately equivalent to the extracted reverberation (e.g., an approximately equivalent C50 value). As discussed above, in a time-domain example, secure data augmentation process 10 may convolve obscured speech signal 522 with the resulting room impulse response. In a frequency-domain example, secure data augmentation process 10 may multiply obscured speech signal 522 with the resulting acoustic transfer function. While one example of applying a room impulse response to obscured speech signal 522 has been described, it will be appreciated that this is for example purposes only and that any number of or type of room impulse responses may be applied to obscured speech signal 522 within the scope of the present disclosure.

In some implementations, augmenting 412 the obscured speech signal based upon, at least in part, the extracted acoustic properties may include adding 534 a noise signal to the obscured speech signal based upon, at least in part, the extracted acoustic properties. For example, suppose that during the generation of obscured speech signal 522 and/or synthetic speech signal 528, TTS system 524 and/or VST system 530 removes the noise properties of the speech signal. In one example, secure data augmentation process 10 may add 534 a noise signal to obscured speech signal 522. For example, secure data augmentation process 10 may use previously extracted noise spectral parameters and SNR, to generate and add noise segments to obscured speech signal 522 at an appropriate SNR. In another example, secure data augmentation process 10 may use previously extracted noise signals and/or noise spectrum, to add 434 a noise signal to various segments of obscured speech signal 522 at an appropriate SNR specified in acoustic embedding 508 and/or acoustic metrics 510.

Suppose that the extracted noise spectrum indicates that input speech signal 500 is recorded adjacent to a noisy hallway. Further suppose that during the obscuring of input speech signal, TTS system 524 and/or VST system 530 generates obscured speech signal 522 with e.g., an anechoic properties (i.e., no noise). In this example, the noise properties of obscured speech signal 522 may be added 432 (e.g., by adding noise spectrum 512) to generate augmented speech signal 534. While one example of adding noise to obscured speech signal 522 has been described, it will be appreciated that this is for example purposes only and that various approaches for adding noise to a speech signal may be applied to obscured speech signal 522 within the scope of the present disclosure.

Augmenting 412 the obscured speech signal based upon, at least in part, the extracted acoustic properties may include applying 436 a spectral balance augmentation to the obscured speech signal based upon, at least in part, the extracted acoustic properties. For example, suppose that during the generation of obscured speech signal 522 and/or synthetic speech signal 528, TTS system 524 and/or VST system 530 adjusts the speaker levels and spectral balance of the speech signal. In this example, secure data augmentation process 10 may estimate a speech level (e.g., P.56/RMS/Peak) from obscured speech signal 522 and/or a LTASS/long term spectrum shape from obscured speech signal 522 and may apply 436 a spectral balance augmentation to obscured speech signal 522 based upon, at least in part, spectral balance 514 extracted from input speech signal 500.

Suppose that input speech signal 500 has an initial spectral balance (e.g., spectral balance 514). Further suppose that during the obscuring of input speech signal, TTS system 524 and/or VST system 530 generates obscured speech signal 522 with a different spectral balance. In this example, the spectral balance of obscured speech signal 522 may be adjusted (e.g., modifying levels of signal components across various frequency bands) until it is approximately equivalent to spectral balance 514 to generate augmented speech signal 534. While one example of applying a spectral balance augmentation to obscured speech signal 522 has been described, it will be appreciated that this is for example purposes only and that other approaches for augmenting spectral balance may be applied to obscured speech signal 522 within the scope of the present disclosure.

In some implementations, secure data augmentation process 10 may securely store the obscured transcription and the augmented speech signal. For example and as shown in FIG. 5, secure data augmentation process 10 may store obscured transcription 520 and augmented speech signal 534 in one or more storage devices or datasources (e.g., datasource 118). In one example, secure data augmentation process 10 may store obscured transcription 520 in another datasource (e.g., datasource 120); and augmented speech signal 534 in another datasource (e.g., datasource 122). In this manner, secure data augmentation process 10 may securely store obscured transcription 520 and augmented speech signal 534 in various datasources to reduce the likelihood of a breach revealing any singular representation of sensitive content. While an example is shown with each of obscured transcription 520 and augmented speech signal 534 being stored in separate datasources, it will be appreciated that this is for example purposes only.

For example, obscured transcription 520 and augmented speech signal 534 may be stored together or apart in any combination across any number of datasources or other storage devices within the scope of the present disclosure. It will also be appreciated that while each of datasources 120 and 122, are shown in a grouping that secure data augmentation process 10 may store obscured transcription 520 and augmented speech signal 534 in any storage device or combination of storage devices locally at and/or remotely from ACI compute system 12 within the scope of the present disclosure.

In some implementations, secure data augmentation process 10 may generate augmented training data for a speech processing system based upon, at least in part, the obscured speech signal and the extracted acoustic properties. As discussed above, secure data augmentation process 10 may augment 412 obscured speech signal 522 include the acoustic properties of input speech signal 500 without storing sensitive content. In addition to generating training data that includes the same acoustic properties as input speech signal 500, secure data augmentation process 10 may generate augmented training data that varying acoustic properties. For example, secure data augmentation process 10 may augment obscured speech signal 522 with a distribution of acoustic properties based upon, at least in part, the extracted acoustic properties. Secure data augmentation process 10 may augment the speaking rate, reverberation, noise, level and/or spectral balance over a range (or over different ranges for each acoustic property) to create more diversity in the training data.

In some implementations, secure data augmentation process 10 may train a speech processing system using the obscured transcription and the augmented speech signal. Referring also to FIG. 6, training a speech processing system (e.g., speech processing system 600) may include providing labeled data (e.g., from a transcription) and input speech data for the speech processing system to "learn" from. For example and as is known in the art, machine learning generally includes the training of an algorithm or combination of to recognize certain types of patterns. Machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the program is provided feedback that is analogous to rewards, which it tries to maximize. While three examples of machine learning approaches have been provided, it will be appreciated that other machine learning approaches are possible within the scope of the present disclosure. As shown in FIG. 6, secure data augmentation process 10 may obtain obscured transcription 520 and augmented speech signal 534 from storage (e.g., datasource 118) and may provide obscured transcription 520 and augmented speech signal 534 as training data for speech processing system 600. In this manner, speech processing system 600 may be trained with augmented speech signals that include acoustic properties of the original input speech signal without the sensitive content.

As discussed above and in some implementations, secure data augmentation process 10 may generate augmented training data by generating multiple obscured transcriptions (e.g., obscured transcription 520) with various surrogates or candidate phrases to use as a replacement for each sensitive content portion or identified class identifier. Secure data augmentation process 10 may replace each class identifier with various candidate phrases from the database of candidate phrases across multiple copies or versions of obscured transcription 520 to generate augmented training data. With each distinct obscured transcription 520, secure data augmentation process 10 may generate respective obscured speech signals and repeat the above-described process. In this manner, secure data augmentation process 10 may multiply the amount of training data available from a single transcription to represent many variations in the surrogate data applied to the obscured transcription and obscured speech signal.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    receiving an input speech signal;
    receiving a transcription of the input speech signal;
    extracting a speaker embedding from the input speech signal;
    extracting acoustic properties from the input speech signal;
    generating an obscured transcription from the transcription, wherein the obscured transcription includes obscured representations of sensitive content from the transcription;
    generating an obscured speech signal based upon, at least in part, the extracted speaker embedding and the obscured transcription, wherein generating the obscured speech signal includes defining a synthetic speaker embedding by modifying the extracted speaker embedding using a speaker embedding modification model, wherein the obscured speech signal includes obscured representations of sensitive content from the input speech signal; and
    augmenting the obscured speech signal based upon, at least in part, the extracted acoustic properties.

2. The computer-implemented method of claim 1, wherein the sensitive content from the input speech signal and the transcription includes personally identifiable information (PII) and/or protected health information (PHI).

3. The computer-implemented method of claim 1, wherein extracting the acoustic properties from the input speech signal includes:
    extracting an acoustic embedding from the input speech signal;
    estimating acoustic metrics within the input speech signal;
    extracting a noise spectrum from the input speech signal;
    measuring spectral balance within the input speech signal; and/or
    measuring a speaking rate within the input speech signal.

4. The computer-implemented method of claim 1, further comprising:
    discarding the input speech signal in response to generating the obscured speech signal.

5. The computer-implemented method of claim 1, wherein generating the obscured speech signal includes:
    modifying the extracted speaker embedding, thus defining a synthetic speaker embedding.

6. The computer-implemented method of claim 1, wherein generating the obscured speech signal includes:
    generating a synthetic speech signal from the obscured speech signal using a synthetic speaker embedding.

7. The computer-implemented method of claim 3, wherein augmenting the obscured speech signal based upon, at least in part, the extracted acoustic properties includes:
    applying a speaking rate augmentation to the obscured speech signal based upon, at least in part, the extracted acoustic properties;
    applying a room impulse response to the obscured speech signal based upon, at least in part, the extracted acoustic properties;
    adding a noise signal to the obscured speech signal based upon, at least in part, the extracted acoustic properties; and/or applying a spectral balance augmentation to the obscured speech signal based upon, at least in part, the extracted acoustic properties.

8. A computing system comprising:
a memory; and
a processor configured to receiving an input speech signal, wherein the processor is further configured to receive a transcription of the input speech signal, wherein the processor is further configured to extract a speaker embedding from the input speech signal, wherein the processor is further configured to extract acoustic properties from the input speech signal, wherein the processor is further configured to generate an obscured transcription from the transcription, wherein the obscured transcription includes obscured representations of sensitive content from the transcription, wherein the processor is further configured to generate an obscured speech signal based upon, at least in part, the extracted speaker embedding and the obscured transcription, wherein generating the obscured speech signal includes defining a synthetic speaker embedding by modifying the extracted speaker embedding using a speaker embedding modification model, wherein the obscured speech signal includes obscured representations of sensitive content from the input speech signal, and wherein the processor is further configured to augment the obscured speech signal based upon, at least in part, the extracted acoustic properties.

9. The computing system of claim 8, wherein the sensitive content from the input speech signal and the transcription includes personally identifiable information (PII) and/or protected health information (PHI).

10. The computing system of claim 8, wherein extracting the acoustic properties from the input speech signal includes:
extracting an acoustic embedding from the input speech signal;
estimating acoustic metrics within the input speech signal;
extracting a noise spectrum from the input speech signal;
measuring spectral balance within the input speech signal; and/or
measuring a speaking rate within the input speech signal.

11. The computing system of claim 8, wherein the processor is further configured to:
discard the input speech signal in response to generating the obscured speech signal.

12. The computing system of claim 8, wherein generating the obscured speech signal includes:
modifying the extracted speaker embedding, thus defining a synthetic speaker embedding.

13. The computing system of claim 8, wherein generating the obscured speech signal includes:
generating a synthetic speech signal from the obscured speech signal using a synthetic speaker embedding.

14. The computing system of claim 10, wherein augmenting the obscured speech signal based upon, at least in part, the extracted acoustic properties includes:
applying a speaking rate augmentation to the obscured speech signal based upon, at least in part, the extracted acoustic properties;
applying a room impulse response to the obscured speech signal based upon, at least in part, the extracted acoustic properties;
adding a noise signal to the obscured speech signal based upon, at least in part, the extracted acoustic properties; and/or
applying a spectral balance augmentation to the obscured speech signal based upon, at least in part, the extracted acoustic properties.

15. A computer program product residing on a non-transitory computer readable medium having a plurality of instructions stored thereon which, when executed by a processor, cause the processor to perform operations comprising:
receiving an input speech signal;
receiving a transcription of the input speech signal;
extracting a speaker embedding from the input speech signal;
extracting acoustic properties from the input speech signal;
generating an obscured transcription from the transcription, wherein the obscured transcription includes obscured representations of sensitive content from the transcription;
generating an obscured speech signal based upon, at least in part, the extracted speaker embedding and the obscured transcription, wherein generating the obscured speech signal includes defining a synthetic speaker embedding by modifying the extracted speaker embedding using a speaker embedding modification model, wherein the obscured speech signal includes obscured representations of sensitive content from the input speech signal;
discarding the input speech signal in response to generating the obscured speech signal; and
augmenting the obscured speech signal based upon, at least in part, the extracted acoustic properties.

16. The computer program product of claim 15, wherein the one or more sensitive content portions include:
personally identifiable information (PII); and/or
protected health information (PHI).

17. The computer program product of claim 15, wherein extracting the acoustic properties from the input speech signal includes:
extracting an acoustic embedding from the input speech signal;
estimating acoustic metrics within the input speech signal;
extracting a noise spectrum from the input speech signal;
measuring spectral balance within the input speech signal; and/or
measuring a speaking rate within the input speech signal.

18. The computer program product of claim 15, wherein generating the obscured speech signal includes:
modifying the extracted speaker embedding, thus defining a synthetic speaker embedding.

19. The computer program product of claim 15, wherein modifying the extracted speaker embedding using a speaker embedding modification system includes modifying the extracted speaker embedding until a speaker verification is unable to verify a speaker's identity using the synthetic speaker embedding.

20. The computer program product of claim 17, wherein augmenting the obscured speech signal based upon, at least in part, the extracted acoustic properties includes:
applying a speaking rate augmentation to the obscured speech signal based upon, at least in part, the extracted acoustic properties;
applying a room impulse response to the obscured speech signal based upon, at least in part, the extracted acoustic properties;
adding a noise signal to the obscured speech signal based upon, at least in part, the extracted acoustic properties; and/or applying a spectral balance augmentation to the obscured speech signal based upon, at least in part, the extracted acoustic properties.

\* \* \* \* \*